(12) United States Patent
Furuse et al.

(10) Patent No.: US 6,774,527 B2
(45) Date of Patent: Aug. 10, 2004

(54) TWO ROTOR SINGLE STATOR TYPE ELECTRIC MOTOR

(75) Inventors: Hisayuki Furuse, Kanagawa (JP); Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 20 days.

(21) Appl. No.: 10/235,484

(22) Filed: Sep. 6, 2002

(65) Prior Publication Data

US 2003/0048034 A1 Mar. 13, 2003

(30) Foreign Application Priority Data

Sep. 7, 2001 (JP) .......................................... 2001-271565

(51) Int. Cl.[7] .................................................. H02K 1/12
(52) U.S. Cl. ...................................... 310/254; 310/268
(58) Field of Search ................................ 310/254, 268, 310/89, 91, 52, 54, 58, 60

(56) References Cited

U.S. PATENT DOCUMENTS

| 4,387,335 A | 6/1983 | Fisher et al. |
| 4,959,578 A | 9/1990 | Varga |
| 5,334,899 A * | 8/1994 | Skybyk ..................... 310/268 |
| 5,767,600 A * | 6/1998 | Whiteley ................... 310/184 |
| 5,973,436 A | 10/1999 | Mitcham |
| 6,114,784 A | 9/2000 | Nakano |

FOREIGN PATENT DOCUMENTS

| DE | 199 54 196 A1 | 6/2000 |
| EP | 0 480 721 A2 | 4/1992 |
| FR | 2 793 083 A1 | 11/2000 |
| JP | 2000-14086 | 1/2000 |
| WO | WO 96/04094 A2 | 2/1996 |

OTHER PUBLICATIONS

Patent Abstracts of Japan, vol. 018, No. 047, Jan. 25, 1994, JP 05–268754.

* cited by examiner

*Primary Examiner*—Thanh Lam
(74) *Attorney, Agent, or Firm*—Foley & Lardner LLP

(57) ABSTRACT

A cylindrical stator is installed in a case. First and second discal rotors are installed in the case and arranged at axially opposed end portions of the cylindrical stator to rotate about an axis of the cylindrical stator. A case bracket is installed in the case to support the cylindrical stator. The case bracket is in abutment with an inner surface of the case to be held in the case. With this arrangement, the cylindrical stator is assuredly held and supported in the case.

12 Claims, 6 Drawing Sheets

TWO ROTOR SINGLE STATOR TYPE ELECTRIC MOTOR

BACKGROUND OF INVENTION

1. Field of Invention

The present invention relates in general to electric motors, and more particularly to electric motors of a two rotor single stator type which comprises two rotors which rotate relative a single common stator. More specifically, the present invention is concerned with the electric motors of a type which has an improved supporting structure for the single common stator.

2. Description of Related Art

One electric motor of the above-mentioned type is shown in Japanese Patent First Provisional Publication (Tokkai) 2000-14086. In the electric motor of this publication, upon feeding a compound electric current to a stator, two rotors, that is, inner and outer rotors are rotated relative to a common stator. By controlling the compound electric current fed to the stator, rotation of the inner rotor and that of the outer rotor are individually controlled. In this electric motor, the stator and the two rotors are all cylindrical in shape and housed in a case, and the inner and outer cylindrical rotors are concentrically disposed in and about the cylindrical stator respectively.

SUMMARY OF INVENTION

In the electric motor of the publication, for transferring rotation of the outer rotor to an external driven member, the outer rotor has an output part that extends diametrically across one axial end of the stator. Both the output part and the outer rotor thus rotate together like a single unit. Thus, in the electric motor of this publication, one axial end of the stator over which the output part of the outer rotor diametrically extends can not be used as a supported portion of the stator due to obstruction by the output part of the outer rotor. Accordingly, supporting of the stator relative to the case has to be made by only the other axial end of the stator, which however tends to induce a complicated and costly supporting structure for the stator. In addition, the complicated supporting structure tends to make a cooling system of the stator complicated. Furthermore, since the space for receiving the stator directly depends on the diameter of the outer rotor, enlargement of the stator is not easily achieved.

It is therefor an object of the present invention to provide an electric motor of two rotor single stator type, whose stator supporting structure is free of the above-mentioned shortcomings.

According to a first aspect of the present invention, there is provided an electric motor which comprises a case; a cylindrical stator which is installed in the cylindrical case; first and second discal rotors which are installed in the case and arranged at axially opposed end portions of the cylindrical stator respectively to rotate about an axis of the cylindrical stator; and a case bracket which is installed in the case to support the cylindrical stator relative to the case, the case bracket being in abutment with an inner surface of the case to be held in the case.

According to a second aspect of the present invention, there is provided electric motor which comprises a cylindrical case; a cylindrical stator which is concentrically installed in the cylindrical case, said stator having a cylindrical center bore; first and second discal rotors which are installed in the cylindrical case and respectively arranged at axially opposed end portions of the cylindrical stator to rotate about a common axis; a hollow output member having the second discal rotor concentrically mounted thereon; an output shaft passing through the cylindrical center bore of the cylindrical stator and having one end portion on which the first discal rotor is concentrically mounted and the other end around which the hollow output member is concentrically disposed keeping a cylindrical space therebetween; and first and second annular bracket members which are tightly and concentrically disposed in the cylindrical case in a manner to put therebetween the cylindrical stator to hold the cylindrical stator relative to the cylindrical case.

DETAILED DESCRIPTION OF INVENTION

In the following, the present invention will be described in detail with reference to the accompanying drawings.

For ease of understanding, various directional terms, such as right, left, upper, lower, rightward, etc., are included in the following description. However, these terms are to be understood with respect to a drawing or drawings on which the corresponding part or portion is shown.

Figure 1:
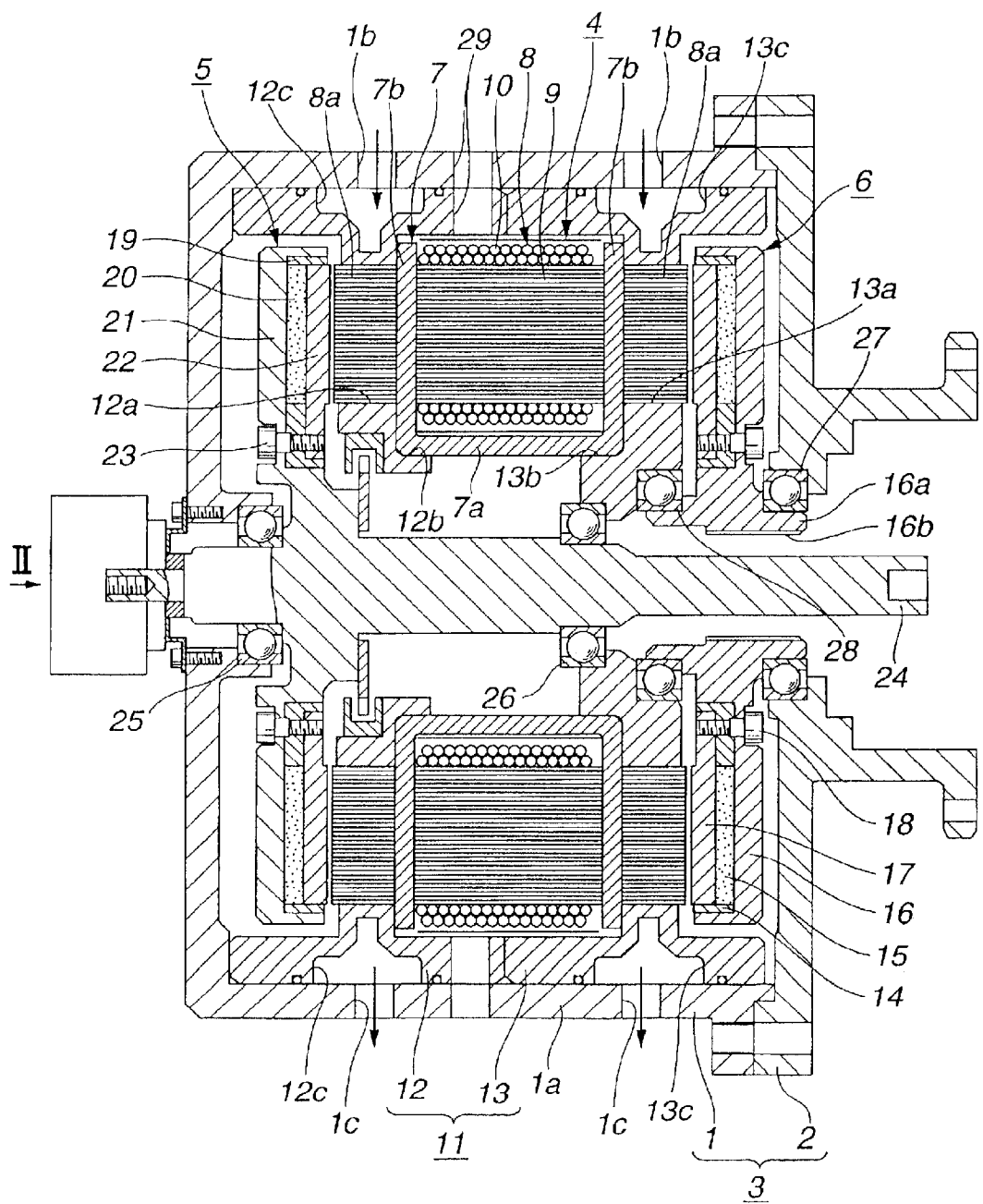
FIG. 1 is a sectional view of an electric motor according to the present invention.

Referring to FIG. 1, there is shown an electric motor 100 according to the present invention, which is of a two rotor single stator type.

The electric motor 100 comprises a cylindrical case 3 which consists of a bottomed cylindrical case member 1 and a circular lid member 2 which covers an open end of case member 1. Within case 3, there are installed a cylindrical stator 4 and first and second discal rotors 5 and 6 which are arranged in such a manner as will be described hereinafter.

The cylindrical stator 4 comprises generally an annular stator bracket 7 and a plurality of stator elements 8 which are held on stator bracket 7.

The annular stator bracket 7 comprises a cylindrical inner wall 7a and two axially spaced annular flanges 7b which extend radially outward from axial ends of the cylindrical inner wall 7a respectively.

Figure 2:
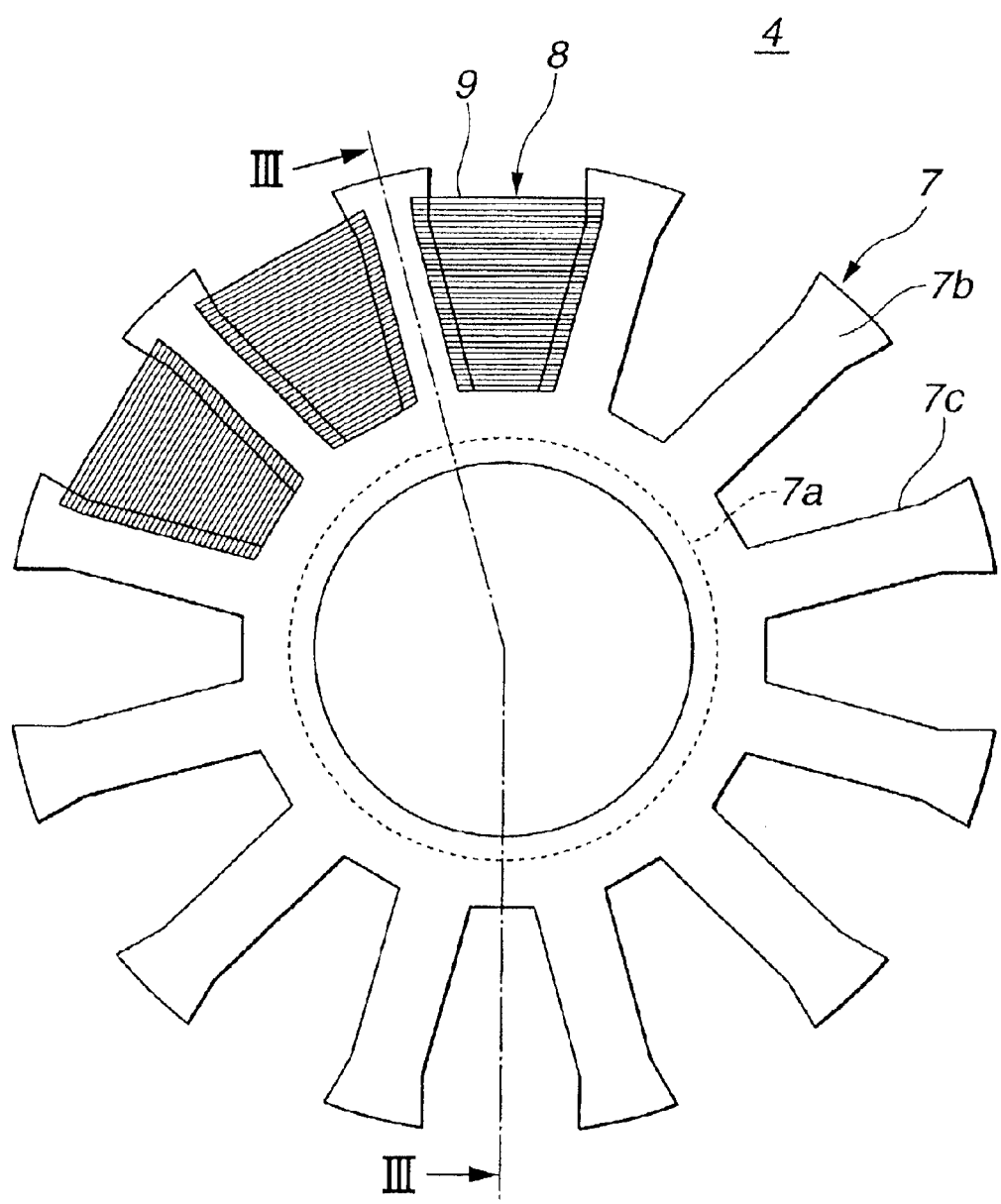
FIG. 2 is a front view of a stator installed in the electric motor, that is taken from the direction of the arrow "II" of FIG. 1.
Figure 3:
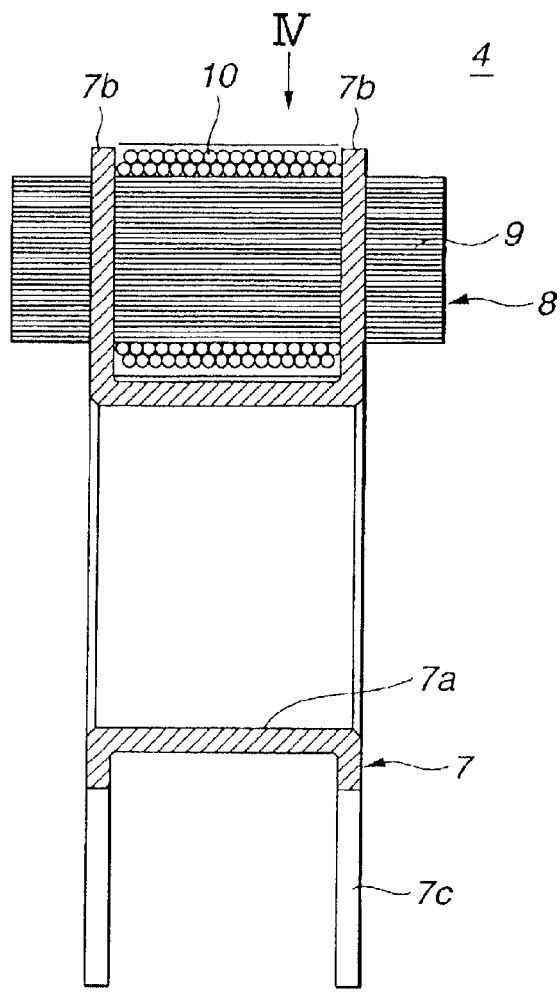
FIG. 3 is a sectional view take along the line "III—III" of FIG. 2.
Figure 4:
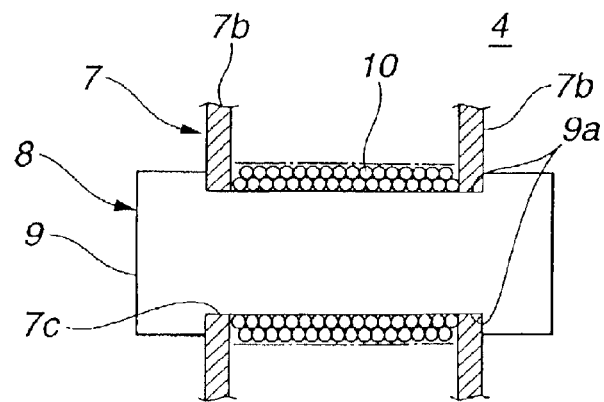
FIG. 4 is a plan view of a part of the stator, that is taken from the direction of the arrow "IV" of FIG. 3.

As is seen from FIGS. 2 to 4, both the annular flanges 7b are formed with a plurality of paired and aligned cuts 7c which are arranged about an axis of annular stator bracket 7 at evenly spaced intervals. As shown, each paired and aligned cuts 7c of annular flanges 7b of stator bracket 7 have the corresponding stator element 8 installed therein.

As is seen from FIG. 3, each stator element 8 comprises a core 9 including a plurality of ferromagnetic rectangular plates put on one another in a radial direction of stator bracket 7, and a coil 10 wound around core 9.

As is seen from FIG. 2, for assembling stator 4, each stator element 8 is inserted into the corresponding paired cuts 7c of annular flanges 7b from the outside of the same.

As is seen from FIG. 4, each core 9 (viz., combined ferromagnetic rectangular plates) is formed at both sides thereof with rectangular recesses 9a which are tightly engaged with side edges of cuts 7c of annular flanges 7b of stator bracket 7. With this engagement, axial displacement of stator element 8 relative to stator bracket 7 is assuredly suppressed, which means that an axial positioning of stator element 8 relative to stator bracket 7 is assured.

Referring back to FIG. 1, the cylindrical stator 4 is coaxially and tightly held in cylindrical case member 1 through an annular case bracket 11. More specifically, the annular case bracket 11 is tightly and concentrically installed in case member 1 having its cylindrical outer surface intimately contacting with an inner surface of a cylindrical wall 1a of case member 1.

The annular case bracket 11 is of a split structure including first and second annular bracket members 12 and 13 which are axially spaced from each other in case member 1. The space between bracket members 12 and 13 is mated with openings 29 formed in cylindrical wall 1a of case 1. Although not shown in the drawing, power cables are led into case 1 through openings 29 and connected with coils 10 of stator elements 8.

As shown in FIG. 1, first and second annular bracket members 12 and 13 have axially outside ends which are in abutment with the bottom of cylindrical case member 1 and circular lid member 2. Thus, positioning and tightening of stator 4 in case 3 are assured.

That is, as will be described in detail hereinafter, cylindrical stator 4 is tightly sandwiched at annular flanges 7b of annular stator bracket 7 thereof between respective recesses 12b and 13b of first and second annular bracket members 12 and 13. With this, axial positioning of stator 4 relative to case 3 is achieved. Respective pole portions 8a provided at axial ends of core 9 of each stator element 8 are tightly held by first and second annular bracket members 12 and 13 as will be described in the following, so that radial positioning of stator 4 relative to case 3 is achieved.

Figure 5:
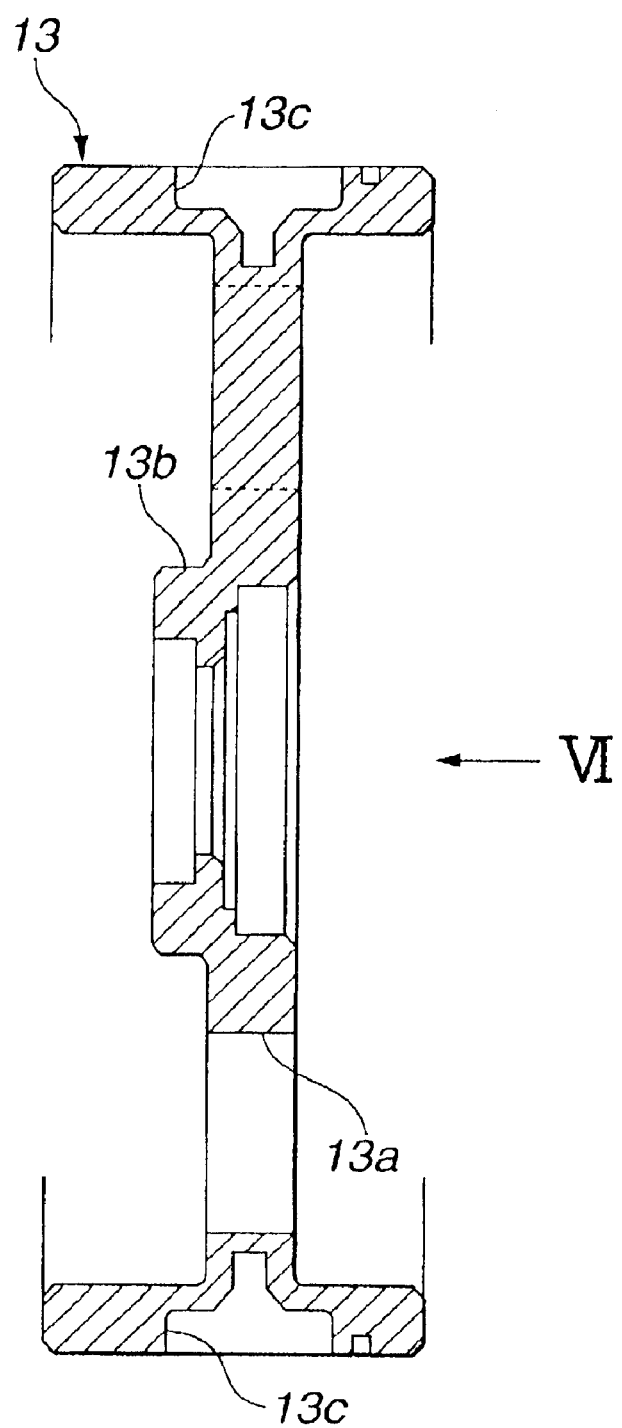
FIG. 5 is a sectional view of a second case bracket member installed in the electric motor of the invention.
Figure 6:
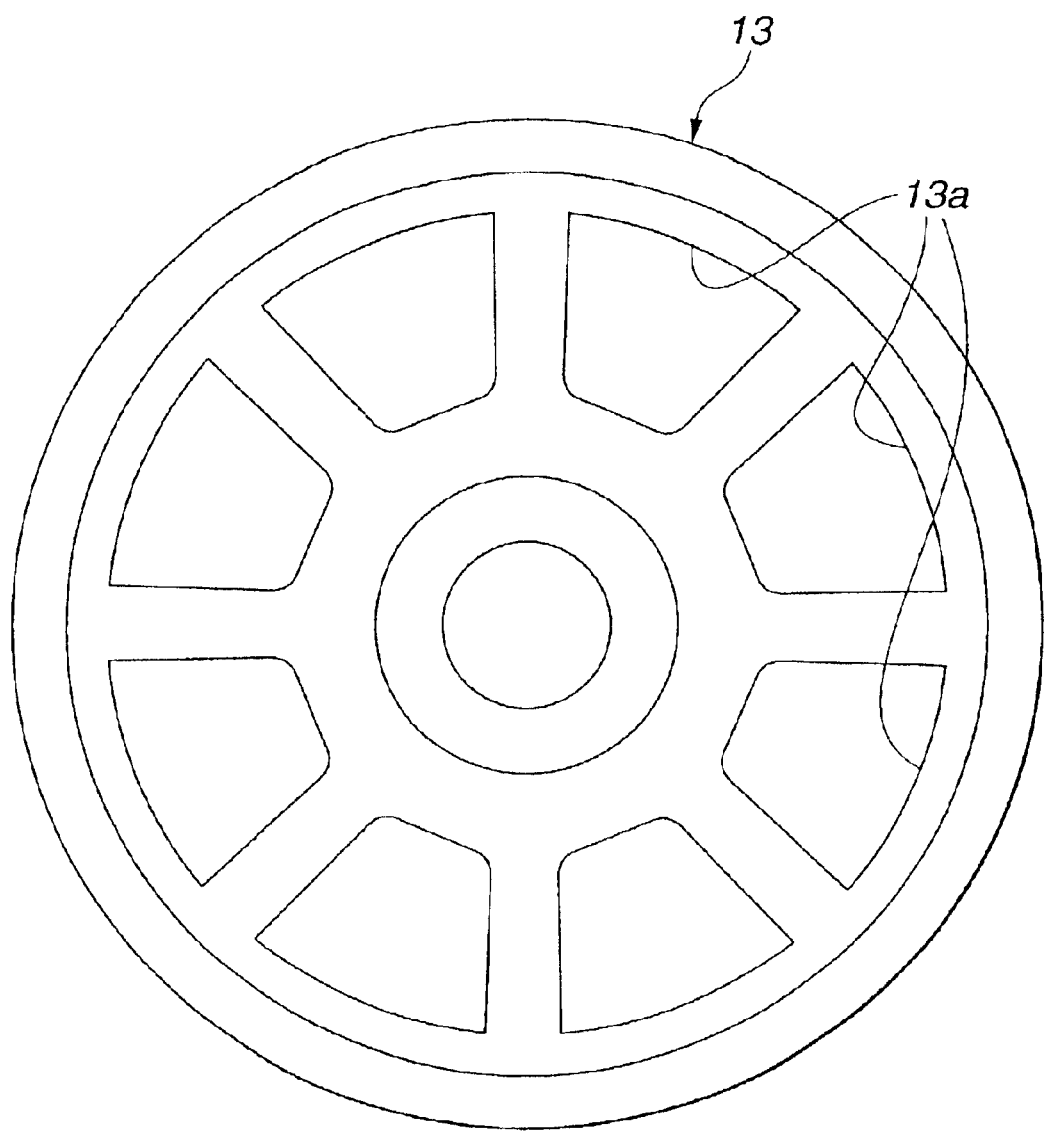
FIG. 6 is a plan view of the second case bracket member, that is taken from the direction of the arrow "VI" of FIG. 5.

As is understood from FIGS. 5 and 6 and FIG. 1, for holding pole portions 8a of each core 9, each of first and second annular bracket members 12 and 13 (only bracket member 13 is shown) is formed with a plurality of trapezoidal openings 12a or 13a which are arranged around an axis of bracket member 12 or 13 at evenly spaced intervals.

Furthermore, as is seen FIGS. 1 and 5, each of first and second annular bracket members 12 and 13 is formed with an annular recess 12b or 13b for tightly receiving a junction portion defined between cylindrical inner wall 7a and corresponding annular flange 7b of annular stator bracket 7. Because of this arrangement, cylindrical stator 4 is tightly held in case 3 by means of annular case bracket 11.

As is seen from FIG. 1, the first and second annular bracket members 12 and 13 of annular case bracket 11 are formed, at cylindrical outer walls that contact the inner surface of cylindrical wall 1a of cylindrical case member 1, with respective annular grooves 12c and 13c which serve as coolant passages. As shown, these coolant passages 12c and 13c are positioned in the vicinity of pole portions 8a of stator elements 8. For obtaining a sufficient heat exchanging between coolant in coolant passage 12c or 13c and corresponding pole portions 8a of stator elements 8, each coolant passage 12c or 13c has a bottom wall which is made as thin as possible so long as the thickness assures a sufficient mechanical strength.

For feeding the coolant to coolant passages 12c and 13c, cylindrical wall 1a of case member 1 is formed with two inlet openings 1b which are exposed to given portions of coolant passages 12c and 13c respectively. For discharging the coolant from coolant passages 12c and 13c, cylindrical wall 1a of case member 1 is formed, at diametrically opposed portions of inlet openings 1b, with outlet openings 1c which are exposed to the other portions of coolant passages 12c and 13c respectively. Under operation of the electric motor 100, the coolant is forced to flow in the direction of the arrows. During flow of the coolant, stator elements 8, especially pole portions 8a thereof are effectively cooled by the coolant.

Referring to FIG. 1, first and second discal rotors 5 and 6 are substantially the same in construction. That is, these rotors 5 and 6 are arranged at left and right positions of cylindrical stator 4 as viewed in the drawing. It is to be noted that first discal rotor 5, cylindrical stator 4 and second discal rotor 6 are coaxially arranged in order, as shown.

Figure 7:
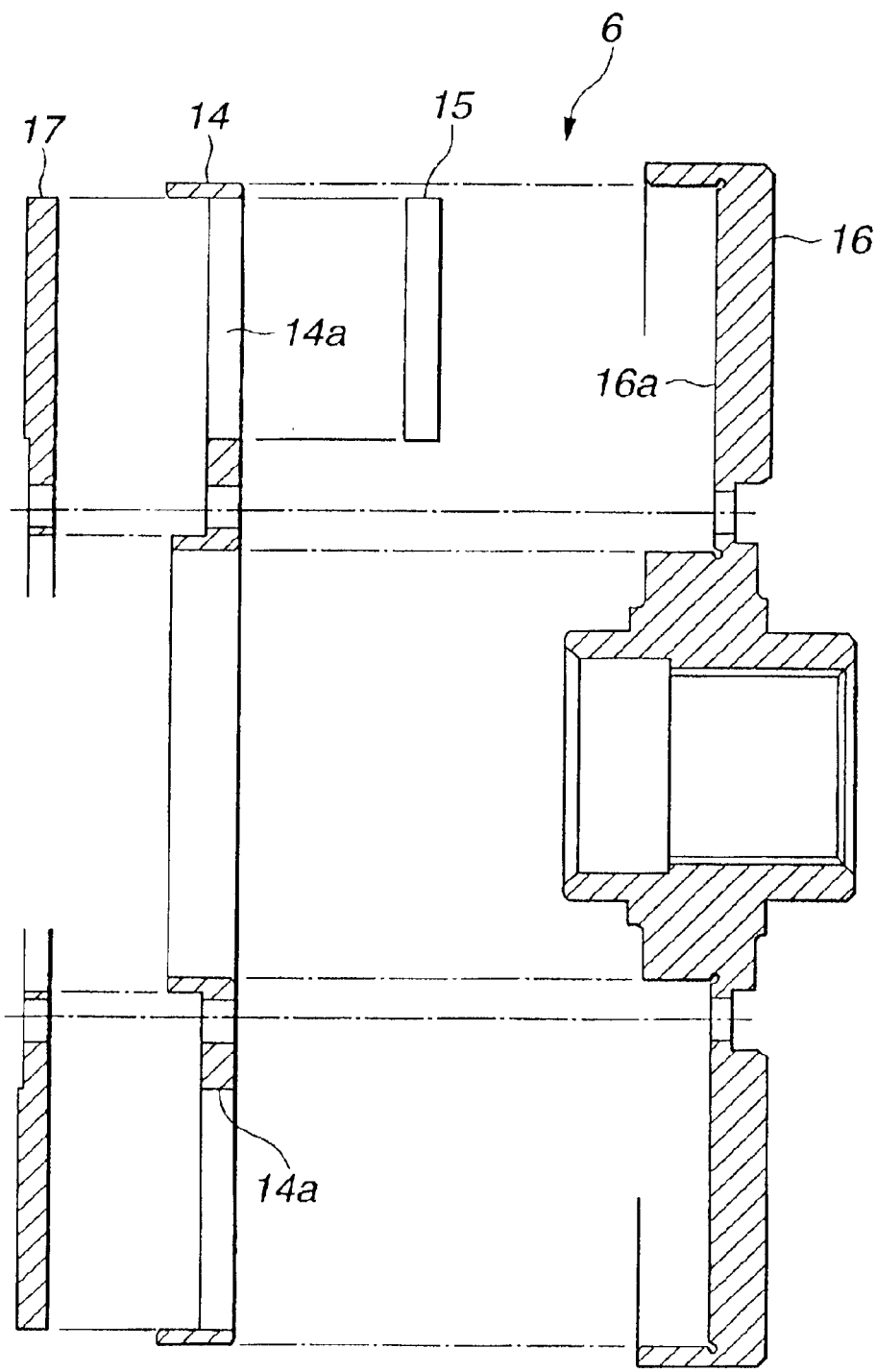
FIG. 7 is a sectional view of parts of a second discal rotor installed in the electric motor of the invention.

Referring to FIG. 7, there is shown, but in an exploded and sectional manner, the second discal rotor 6 which comprises an annular magnet holder 14. The annular magnetic holder 14 is formed with a plurality of openings 14a which are arranged around an axis of annular magnet holder 14 at evenly spaced intervals. A corresponding number of magnets 15 are put in the openings 14a, and annular magnetic holder 14 thus having magnets 15 installed thereon is received in an annular recess 16a of a circular rotor base member 16. An annular lid member 17 is put on annular magnetic holder 14 and secured to rotor base member 16 by means of bolts 18 (see FIG. 1) having magnets 15 in annular magnet holder 14 tightly put therebetween. Thus, second discal rotor 6 is an assembled structure having a plurality of magnets 15 which are arranged about an axis of second discal rotor 6 at evenly spaced intervals.

As is seen from FIG. 1, the first discal rotor 5 is substantially the same as the above-mentioned second discal rotor 6 except for the shape of a rotor base member 21 as will be described hereinafter. That is, the first discal rotor 5 comprises generally an annular magnetic holder 19, a plurality of magnets 20 held by magnet holder 19, an annular rotor base member 21 receiving a unit consisting of magnet holder 19 and magnets 20 and an annular lid member 22 secured to rotor base member 21 by means of bolts 23 having the unit tightly put therebetween.

However, as is seen from FIG. 1, annular rotor base member 21 of first discal rotor 5 is integral with a first output shaft 24 which extends axially through a center portion of casing 3. That is, circular rotor base member 21 is extends radially outward from a larger diameter left end of first output shaft 24. As shown, first output shaft 24 is rotatably held in case 3 by both a bearing 25 which is connected to the bottom wall of case member 1 and another bearing 26 which is connected to second annular bracket member 13. As shown, a right end of first output shaft 24 passes through a center opening of circular lid member 2 to be exposed to the outside of case 3. Although not shown in the drawing, the exposed right end of first output shaft 24 is connected to a driven member to rotate together with the same.

While, as is seen from FIGS. 1 and 7, rotator base member 16 of second discal rotor 6 is formed with a center boss portion 16a which is opened and rotatably held in case 3 by both a bearing 27 which is connected to circular lid member 2 and another being 28 which is connected to second annular bracket member 13. The opened center boss portion 16a is concentrically disposed about a smaller diameter right end portion of first output shaft 24 keeping a cylindrical clearance therebetween. The opening of center boss portion 16a is splined (16b) for connecting with a left end of a second output shaft (not shown) which also passes through the center opening of circular lid member 2. Of course, second output shaft is constructed of a hollow member for concentrically receiving therein the right end portion of first output shaft 24. Thus, when second discal rotor 6 is rotated, the second output shaft is rotated about and relative to first output shaft 24.

When, now, coils 10 of stator 4 are supplied with compound electric current through the power cables connected thereto, first and second annular rotors 5 and 6 are driven or rotated about a common axis which first and second output shafts 24 commonly have. By controlling the compound electric current, rotation of first discal rotor 5 and that of second discal rotor 6, and thus, rotation of first output shaft 24 and that of the second output shaft are individually controlled.

In the following, advantageous features of electric motor 100 of the present invention will be described.

As is described hereinabove and as is easily understood from FIG. 1, within case 3, there are installed cylindrical stator 4 which is immovably set therein and first and second discal rotors 5 which are rotatably arranged at axially opposed end portions of cylindrical stator 4. Tight holding of stator 4 in case 3 is achieved by using first and second annular bracket members 12 and 13 whose cylindrical outer surfaces are in abutment with cylindrical inner surface 1a of case member 1. Rotation of first discal rotor 5 is transmitted to a first external driven member (not shown) through first output shaft 24 which extends rightward in FIG. 1 through a center bore of case 3, and rotation of second discal rotor 6 is transmitted to a second external driven member (not shown) through the second output shaft (not shown) which extends in the same direction as first output shaft while covering the same.

That is, the stator 4 is stably held by two supporting means that are first and second annular bracket members 12 and 13 tightly received in case 3. In other words, unlike the stator of the electric motor in above-mentioned Japanese Patent First Provisional Publication 2000-14086, axially opposed end portions of stator 4 are tightly supported by case 3 through respective supporting members 12 and 13. That is, tight and assured supporting of stator 4 in case 3 is readily achieved by the above-mentioned construction that is simpler than that of the publication, which brings about an advantage in cost.

Cooling of stator elements 8 is carried out by flowing coolant in annular grooves 12c and 13c which are formed in first and second annular bracket members 12 and 13. Providing first and second annular bracket members 12 and 13 with such grooves 12c and 13c is not difficult, which also brings about an advantage in cost.

First and second discal rotors 5 and 6 are respectively positioned at axial ends of stator 4. Each rotor 5 or 6 has no part that covers the cylindrical outer surface of stator 4. Thus, unlike the case of the electric motor of the above-mentioned publication, the space for stator 4 is not affected by the size of rotors 5 and 6. That is, the size of stator 4 can be freely increased when needed.

In stator 4, all of stator elements 8 are held by the common stator bracket 7. This means that the stator can be previously assembled before the same is put into case 3. This production procedure improves the work for assembling the electric motor 100.

Radial positioning of each stator element 8 relative to case 3 is achieved by engagement of pole portions 8a thereof with openings 12a and 13a of first and second annular bracket members 12 and 13, and axial positioning of each stator element 8 relative to case 3 is achieved by engagement of rectangular recess 9a (see FIG. 4) with edges of cuts 7c of annular flanges of stator bracket 7. This means that positioning of stator 4 in case 3 is assuredly made. Due to provision of rectangular recess 9a in each stator element 8 and cuts 7c of annular flanges of stator bracket 7, which are latchably engageable as shown in FIG. 4, the work for mounting stator elements 8 onto to stator bracket 7 is easily achieved.

As is seen from FIG. 1, due to engagement of the junction portions between cylindrical inner wall and annular flanges 7b of stator bracket 7 with annular recesses 12b and 13b of first and second annular bracket members 12 and 13, axial positioning of stator 4 relative to case 3 is much assured.

Before being inserted into case member 1, stator 4 and first and second annular bracket members 12 and 13 are previously assembled to constitute a unit. Under this condition, for the reasons as mentioned hereinabove, stator elements 8 are tightly fixed to stator bracket 7. Accordingly, subsequent work for inserting the unit into case member 1 is easily and speedily carried out.

The coolant passages 12c and 13c of first and second annular bracket members 12 and 13 have each a thinner bottom wall. Accordingly, stator elements 8, particularly pole portions 8a thereof which are easily heated, are effectively cooled by coolant flowing in coolant passages 12c and 13c.

The entire contents of Japanese Patent Application 2001-271565 filed Sep. 7, 2001 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An electric motor comprising:
    a cylindrical case;
    a cylindrical stator which is installed in the cylindrical case;
    first and second discal rotors which are installed in the case and arranged at axially opposed end portions of the cylindrical stator respectively to rotate about an axis of the cylindrical stator, the first and second discal rotors configured to rotate individually relative to the cylindrical stator; and
    a case bracket which is installed in the case to support the cylindrical stator relative to the case, the case bracket being in abutment with an inner surface of the case to be held in the cylindrical case.

2. An electric motor as claimed in claim 1, in which the the cylindrical stator is concentrically disposed in the cylindrical case and the case bracket is annular in shape and contacts at a cylindrical outer surface thereof with the inner surface of a cylindrical wall of the cylindrical case.

3. An electric motor as claimed in claim 1, in which the cylindrical stator comprises:
    an annular stator bracket;
    a plurality of stator elements held by the annular stator bracket, the stator elements being arranged around a axis of the annular stator bracket at evenly spaced intervals;

a first structure through which axial end portions of each of the stator elements are in abutment with the ase bracket thereby to achieve a radial positioning of the stator relative to the cylindrical case; and a second structure through which the annular stator bracket is in abutment with the annular case bracket thereby to achieve an axial positioning of the stator relative to the cylindrical case.

4. An electric motor as claimed in claim 3, in which the annular stator bracket is formed with a plurality of cuts which are arranged around an axis of the annular stator bracket at evenly spaced intervals for putting therein the stator elements respectively, the cuts extending radially inward from a peripheral portion of the annular stator bracket to permit insertion of the stator elements thereinto from the peripheral portion.

5. An electric motor as claimed in claim 4, in which each of the stator elements is formed at opposed sides thereof with paired rectangular recesses which are latchably engaged with given portions of the annular stator bracket when the stator element is inserted into the corresponding cut, thereby to establish an axial positioning of the stator element relative to the annular stator bracket.

6. An electric motor as claimed in claim 3, in which a radially inward portion of the annular stator bracket is in abutment with a radially inward portion of the case bracket thereby to establish a radial positioning of the stator bracket relative to the cylindrical case.

7. An electric motor as claimed in claim 3, in which the cylindrical case bracket comprises first and second annular bracket members which are tightly received in the cylindrical case having the cylindrical stator intimately put therebetween.

8. An electric motor as claimed in claim 7, in which axial end portions of each stator element held by the annular stator bracket are respectively and intimately received in aligned openings formed in said first and second annular bracket members of the cylindrical case, thereby to achieve a radial positioning of the cylindrical stator relative to the cylindrical case.

9. An electric motor as claimed in claim 7, in which axially opposed portions of a radially inward part of the annular stator bracket are intimately and respectively put in recesses respectively formed in said first and second annular bracket members of the cylindrical case, thereby to achieve an axial positioning of the cylindrical stator relative to the cylindrical case.

10. An electric motor as claimed in claim 2, in which the cylindrical case bracket is formed at its cylindrical outer surface with at least one coolant following annular groove which extends around the cylindrical stator.

11. An electric motor as claimed in claim 7, in which the first and second annular bracket members of the case bracket are respectively formed at cylindrical outer surfaces thereof with coolant flowing annular grooves which extend around the cylindrical stator in the vicinity of axial ends of the stator elements.

12. An electric motor comprising:

a cylindrical case;

a cylindrical stator which is concentrically installed in the cylindrical case, said stator having a cylindrical center bore;

first and second discal rotors which are installed in the cylindrical case and respectively arranged at axially opposed end portions of the cylindrical stator to rotate about a common axis;

a hollow output member having the second discal rotor concentrically mounted thereon;

an output shaft passing through the cylindrical center bore of the cylindrical stator and having one end portion on which the first discal rotor is concentrically mounted and the other end around which the hollow output member is concentrically disposed keeping a cylindrical space therebetween; and first and second annular bracket members which are tightly and concentrically disposed in the cylindrical case in a manner to put therebetween the cylindrical stator to hold the cylindrical stator relative to the cylindrical case.

* * * * *